United States Patent [19]
Pocachard

[11] 3,899,790
[45] Aug. 12, 1975

[54] APPARATUS FOR TAKING UNDERWATER PICTURES

[75] Inventor: Alain Pocachard, Marseille, France

[73] Assignees: Le Nickel; Centre National pour l;Exploitation des Oceans, both of Paris; Erji, Marseille, all of France; part interest to each

[22] Filed: Nov. 15, 1973

[21] Appl. No.: 415,986

[30] Foreign Application Priority Data
Nov. 15, 1972 France .............................. 72.70458

[52] U.S. Cl. ..... 354/64; 200/61.45 M; 200/81.9 M; 200/84 C
[51] Int. Cl. .......................................... G03b 17/08
[58] Field of Search .... 95/11 W; 200/81.9 M, 84 C, 200/61.45 M, 83 L; 335/205

[56] References Cited
UNITED STATES PATENTS
2,019,059 10/1935 Sherman ........................... 95/11 W
3,738,248 6/1973 Fish et al. .......................... 95/11 W
3,750,547 8/1973 Walthier et al. .................... 95/11 W FOREIGN PATENTS OR APPLICATIONS
198,123 8/1967 U.S.S.R. .............................. 95/11 W Primary Examiner—Richard L. Moses
Attorney, Agent, or Firm—Fleit & Jacobson

[57] ABSTRACT

There is disclosed an automatically triggered free-fall type apparatus for taking underwater pictures. The apparatus comprises ballast and floats which exert opposing forces on a triggering device to maintain the triggering device in an unactuated position. When the ballast reaches the sea bed, the triggering device is actuated to activate cameras and light generators adjustably mounted behind windows in carrying means on the apparatus.

4 Claims, 4 Drawing Figures

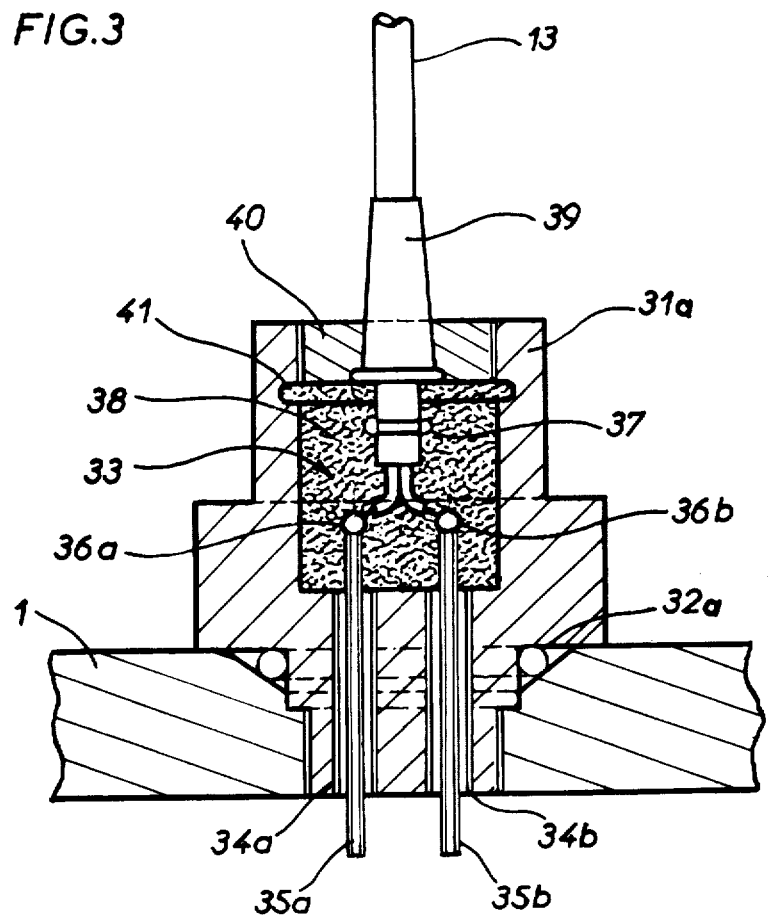

APPARATUS FOR TAKING UNDERWATER PICTURES

This invention relates to an apparatus for use in taking underwater pictures; the underwater depths may be as great as 6,000 metres and the apparatus is triggered automatically upon coming into contact with the sea-bed.

So-called "free fall" devices are frequently employed for exploration of sea-beds. Such devices are equipped with floats and with ballast, and are launched from a ship to which they are not attached. Under the action of the ballast whose weight overcomes the action of the floats, these devices which may, for example, be sampling devices or instruments for taking photographs, sink until they touch the sea-bed. At this instant, the ballast is automatically separated from the device, by means which will not be described herein since they are not relevant to the present invention. The exploiting operation, that is to say the taking of samples or the taking of photographs, may occur simultaneously with the release of the ballast and the device then rises the action of the floats to the sea surface where it may be recovered.

As indicated above, devices for taking underwater pictures, in accordance with the present invention, form part of the group of free-fall devices.

Known free-fall devices of this kind usually comprise a sealed casing which is formed with a transparent window and contains a camera of conventional type coupled with a generator of light flashes which is known as a flash generator. It is also well known that the flash generator is usually operated automatically on operation of the camera.

In these known devices, the triggering of the apparatus upon coming into contact with the sea-bed is effected, for example, by the displacement of a permanent magnet housed within the sealed casing and by the displacement of a co-ordinated follower magnet which is mechanically connected to the operating button of the camera.

The known devices have a number of disadvantages, among which it is an inherent lack of reliability, accidental operation usually caused by handling while being placed in the water, and failure of the shutter release actuator on contacting the sea-bed, for example due to jamming of the control magnet or of the mechanism coupled to the follower magnet.

It is one of the objects of the present invention to provide a free-fall device of the kind described above, which is actuated automatically and reliably on contacting the sea-bed and which is not liable to involve accidental triggering actions.

Another object of the invention is to provide a free-fall device of this kind which is watertight when submerged at depths of the order of 6,000 metres.

A further object of the invention is to separate the optical circuits of the camera and the flash generator.

Yet a further object of the invention is to allow a predetermined directional setting with respect to the vertical to be imparted to the photographic apparatus during its progress towards the sea-bed which renders it possible to select the exposure angle.

In accordance with the present invention there is provided an apparatus for taking underwater pictures on making contact with the sea-bed, the apparatus comprising a sealed casing provided with at least one window; camera means and a flash generator housed within the casing; a framework on which the casing is adjustably mounted; means for connecting the framework to a float and means for detachably connecting the framework to ballast; electromagnetic triggering means arranged between the float and the ballast to close an electrical circuit when contact is made with the sea-bed; an electromagnetic control device arranged within the sealed casing to actuate the camera means and the flash generator on closing of said electrical circuit; and an electric cable which provides a sealed connection between the electromagnetic triggering means and the electromagnetic control device.

Preferably, said casing is removably mounted on said framework and said electric cable provides a removable connection between said electromagnetic triggering means and said electromagnetic control device.

Preferably also, said electromagnetic triggering means comprise a cylindrical member formed with a blind axial bore; a plunger which is axially movable in said bore; a permanent magnet mounted on the head of the plunger which faces the normally upper end of said bore; means for holding the plunger with the magnet within the bore; means for urging the plunger and the magnet towards the upper end of the bore; a reed switch which is arranged in a recess in said cylindrical member adjacent the closed upper end of said bore and which is connected in series in said electrical circuit.

It is, of course, well known that a reed switch comprises a miniature envelope, usually of glass, which is sealed and contains two metal contacts which are brought into contact with one another under the action of an external magnetic source. A switch of this kind may be incorporated into an electrical circuit by means of two terminals each of which is connected to one of the metal contacts.

The plunger preferably extends out of said bore as a rod of smaller diameter and an apertured plug is screwed into the bore to hold the plunger and said permanent magnet within the bore.

The elastic return means for urging the plunger and the permanent magnet upwardly in the bore, advantageously comprise a small plate provided with two lugs and clamped at right angles to the axis on the free end of the rod-like extension of the plunger between a nut and a check nut, two annular grooves being formed symmetrically in the cylindrical member of the triggering means; and two elastic loops each of which passes through one of said grooves and is stretched over the corresponding lug of said small plate.

The cylindrical member of the electromagnetic triggering means is advantageously connected by means of a connecting element to the frame which carries the sealed casing, the plunger of this triggering means being coupled to the ballast in a separable manner by means of a cable and an automatic release device. In this case, the connecting element may comprise a stirrup passing round a lower part of the framework and formed with a hole for passage of the cylindrical member of the trigger, the cylindrical member being held by means of a screw-threaded cap.

It will be appreciated from the above that, while sinking towards the sea-bed, the permanent magnet is held away from the upper end of the bore, against the action of the elastic loops, under the upward pull of the floats and the downward pull of the ballast. When the apparatus reaches the sea-bed, the force exerted by the ballast is removed or at least considerably reduced, and the loops displace the magnet upwardly. The tractive force of the loops is, of course, appropriately selected of this purpose. The action of the magnet on the reed switch then closes the electrical circuit, which causes the actuation of the electromagnetic control device housed in the casing.

This arrangement offers the advantage of a degree of reliability of operation which is superior to that known in the prior art. The magnet moves within a bore which is filled with water and this eliminates any problem of sealing, and also endows the system with a degree of inertia which is advantageous. On the other hand, the control by means of a reed switch renders the operation independent of the speed of displacement of the magnet and so eliminates a principal cause of failure which occurs in the prior art devices.

The framework within which the sealed casing is installed is advantageously provided with two parallel upright members which are formed with series of aligned holes, and said casing is clamped in a collar secured on the framework by transverse screws which extend through two aligned holes of said series. This arrangement renders it possible to instal the casing in a removable and directionally adjustable manner which permits selection of the angle of exposure.

As for the windows of the sealed case, there are advantageously two, the object lens of the photographic camera being positioned facing one of the windows and the flash generator facing the other, so that the optical fields of these two devices are separated.

Each of the windows may have a lapped frustoconical part in mating engagement with a corresponding frustoconical part of the casing, with the interpositioning of a toroidal sealing joint. Tests within a caisson have demonstrated that this arrangement ensures hermetic sealing of the casing up to a pressure of the order of 600 bars, which corresponds to a submerged depth of approximately 6,000 metres.

Advantageously, the electrical circuit comprising the reed switch and the electromagnetic control device is provided with a safety switch which closes the circuit when a predetermined external pressure is exerted on the sealed casing. Thanks to this safety switch, the electrical circuit remains open and the device for taking exposures remains inactive for as long as the device has not been submerged to sufficient depth, which acts to prevent accidental triggering upon launching.

An embodiment of the present invention will now be described, by way of example, with reference to the accompanying drawings in which.

Figures 1, 1A:
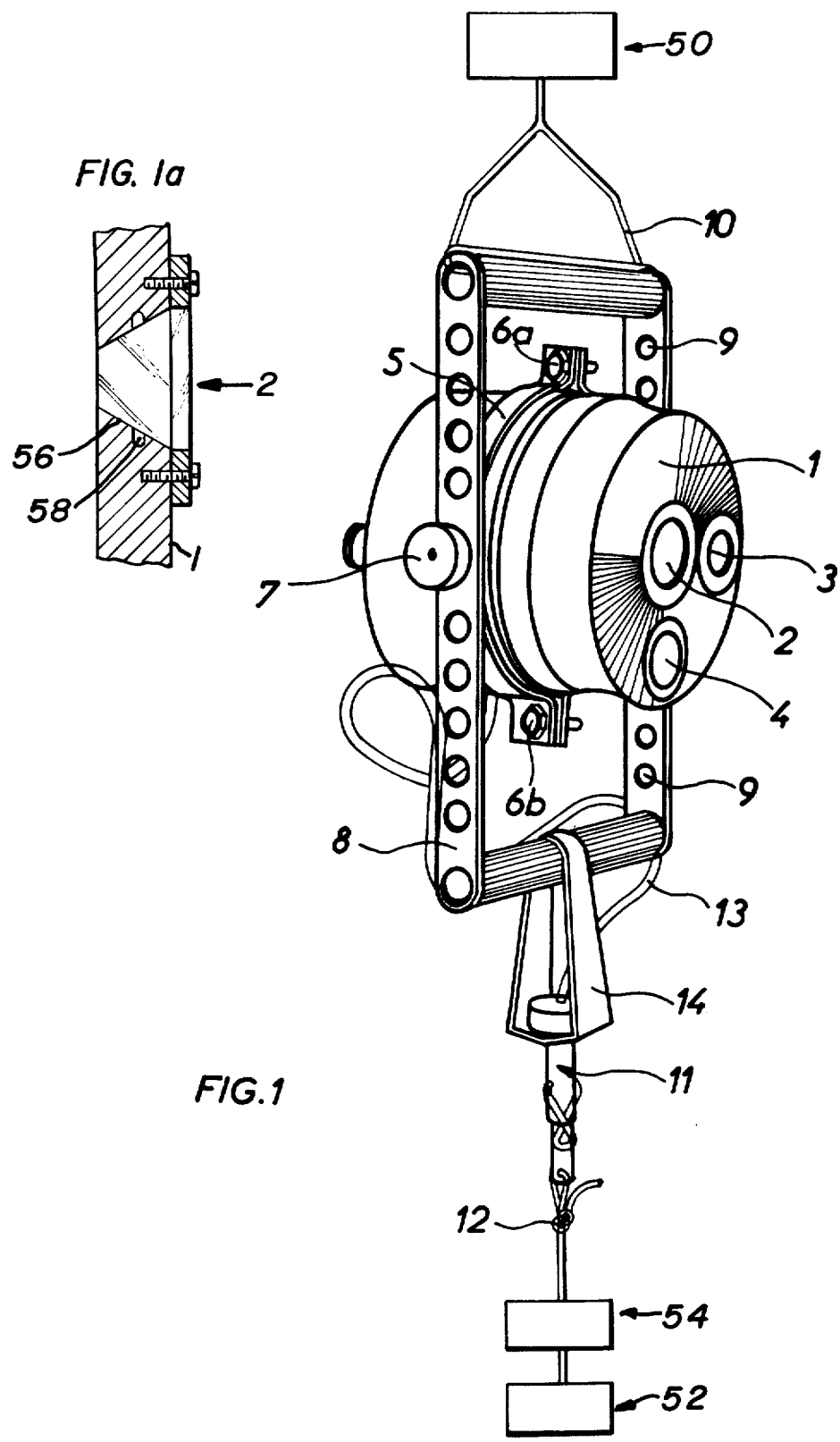
FIG. 1 is a diagrammatic perspective view of an apparatus according to the invention for taking underwater pictures.
FIG. 1a is a section through a window.

Referring to FIG. 1 of the drawings, the apparatus for taking underwater pictures in accordance with the invention comprises a sealed cylindrical casing 1 containing a photographic camera (not illustrated), and a flash generator which also is not shown but is also of a conventional kind. The flash generator is electrically connected in an equally conventional manner, to the photographic camera and is arranged to project a light flash at the instant of exposure.

On one of its plane surfaces, the casing 1 is provided with two sealed windows 2, 3. The first window 2 faces the object lens of the photographic camera to allow passage of light to the lens and thus to the film upon exposure. The second window 3 faces the flash generator to enable the light flashes to pass outside the casing. The casing is also provided with a safety switch 4 which will subsequently be described.

A collar 5 is clamped around the casing 1, the collar being formed as two yokes which are joined together by means of screw-threaded bolts and nuts 6a and 6b. The collar is itself mounted by means of screws 7 in a rectangular frame 8 of which each upright member is formed with a series of holes 9 to receive the screws 7. Thus, it is possible to set the height at which the casing 1 is mounted in the frame 8 by appropriately selecting the pair of aligned holes 9 through which the screws 7 are inserted. Also, the casing 1 may be angled in relation to the frame 8, by swivelling about the screws 7, and the casing can be secured in a desired angular position by tightening the screws 7.

At its upper part, the frame 8 is connected by means of a cable 10, or alternatively directly, to floats 50 shown schematically in FIG. 1, the function of the floats having been mentioned above. The upper part of the frame 8 suitably comprises a tubular member rigidly secured at its extremities to the upright members of the frame 8. The two ends of the tubular member are open and the cable 10 can be threaded through the tube to connect the tubular member to the float.

At its lower part the frame 8 carries an electromagnetic triggering device indicated generally by the reference numeral 11, and the free extremity of the triggering device 11 is secured to a cable 12 which is releasably connected to ballast 52 via releasing device 54. As indicated above, the ballast is released when the assembly touches the sea-bed, and this is suitably performed by interposing between the cable 12 and the ballast a casting-off device which may be of the type described in copending British Pat. application No. 34079/73.

Figure 2:
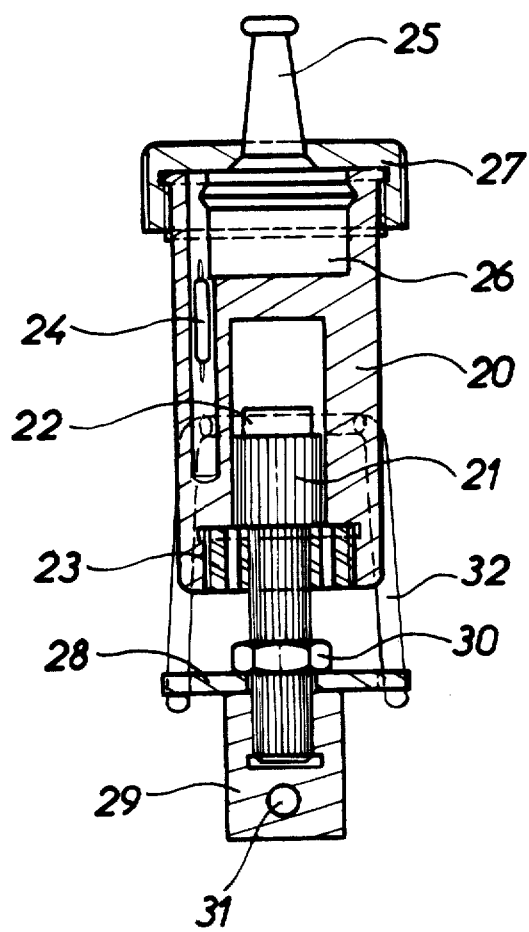
FIG. 2 shows the triggering means of the apparatus, in longitudinal cross-section; and, FIG. 3 shows a hermetically sealed electrical lead-in connection of the apparatus, also in longitudinal cross-section.

The electromagnetic triggering device 11 which operates the photographic apparatus when the assembly touches the sea-bed, is illustrated in greater detail in FIG. 2. The device 11 comprises a cylindrical member 20 formed in its lower part with a blind axial bore in which a plunger 21 is axially slidable. The head of the plunger, i.e. the part extending towards the upper closed end of the blind bore, carries a small permanent magnet 22. The lower part of the plunger 21 extends as a rod of smaller diameter which passes freely through a plug 23 screwed into the base of the cylindrical member 20 to position the plunger 21 with the magnet 22. The cylindrical member 20 is also formed near one side with a recess which extends downwardly and alongside the blind bore which accommodates the plunger 21 and the permanent magnet 22. A reed switch 24 is provided in this recess at the level reached by the magnet 22 when the magnet is in its upper position. The reed switch is of well-known form and comprises a sealed glass envelope containing two metal contacts which are movable towards one another under the action of an external magnetic source.

At the upper part of the cylindrical member 20, a resilient sleeve 25 provides a supporting guide for an electric cable 13 (illustrated in FIG. 1) which connects the reed switch 24 to the mechanism in casing 1. A lining 26 formed of a polymerisable resin, with the interpositioning of a toroidal joint or packing threaded over the cable 13, is provided for sealing purposes. The assembly is held in position by means of a screw-threaded plug 27 which caps the top end of the member 20.

The triggering device 11 is connected to the frame 8 by means of a stirrup 14 which extends round the lower horizontal tubular member of the frame and is formed in its lower portion or yoke with a hole through which the member 20 extends. The member 20 is supported by the stirrup 14 by means of the lower rim of screw-threaded plug 27.

The rod-like lower part of the plunger 21 is screw-threaded and carries a check nut 30. A small transverse plate 28 is formed with a central opening through which the rod-like part of plunger 21 extends, and the plate 28 is clamped between an internally screw-threaded cylindrical cap 29 and the check nut 30. A hole 31 drilled at right angles to the axis of the cap 29, without traversing its tapped hole, receives the cable 12 (FIG. 1) which, as described above, connects the assembly to the ballast. Two similar rubber or like elastic loops 32 anchored in transverse bores in the cylindrical member 20 are stretched round lugs at the ends of the small plate 28 and act to urge the plunger 21 and its permanent magnet 22 upwardly within the axial bore in the member 20.

The operation of the electromagnetic trigger will now be described. When the device for taking pictures is sinking towards the sea-bed, the forces exerted upwardly by the floats and downwardly by the ballast act to urge the plunger 21 downwardly against the loops 32. However, when the ballast touches the sea-bed, the downwardly acting force is removed or substantially diminished and the magnet 22 on the plunger 21 moves upwardly to lie adjacent the reed switch 24. In this position, the magnet closes the reed contacts, and thus the electric circuit in which the switch 24 is incorporated is closed. It is to be noted that, although the apparatus is submerged, which imparts a resistance to movements of the parts, this does not impose any real disadvantage, as opposed to conventional equipment of comparable kinds. The incorporation of a reed switch, which is also unaffected by water; ensures that the speed of movement of the magnet has no effect on the actuation of the device. It will also be appreciated that the closing of the switch 24 operates the camera by means of an actuating device which is housed in the casing 1 and is connected to the switch 24 by the cable 13.

The actuating device comprises an electromagnet (not illustrated) which unlocks a catch when the circuit is closed, and the catch is arranged to effect operation of the camera and flash generator.

The above electric circuit incorporates the safety switch 4 (FIG. 1) which is arranged to be operated by external hydrostatic pressure, and which may be of the kind described in our French Pat. application No. 72.37957 filed on Oct. 26, 1972. The switch 4 interrupts the electrical circuit until the photographic apparatus is submerged to a predetermined depth, for example 10 metres, and this arrangement acts to prevent accidental actuation upon launching in the water. On the other hand, the switch is suitably installed in such a manner that it may be manually actuated to allow test photographs to be taken before the apparatus is immersed in the water.

The connection of the cable 13 to the part of the electrical circuit situated within the casing 1 is established by means of a robust hermetically-sealed connector illustrated in FIG. 3. This connector comprises a plug 31a screwed into the casing 1 with the interposition of a toroidal sealing joint or packing 32a. Outside the casing, the plug 31a is formed with an axial recess 33 and two tapped holes 34a, 34b extend from the bottom of the recess 33 to open inside the casing. Screwthreaded contact rods 35a and 35b, respectively, are held in position in reach of the holes 34a and 34b by means of a lining of polymerisable resin such as ARALDITE. The rods 35a and 35b extend downwardly through the tapped holes 34a and 34b towards the inside of the casing 1 to connect with the electrical circuit (not illustrated) and extend upwardly into the base of the recess 33. The diameter of the holes 34a and 34b is preferably approximately twice that of the screw-threaded rods.

The cable 13 extends into the axial recess 33 where its two wires 36a and 36b are connected to the corresponding rods 35a and 35b. A toroidal joint 37, surrounding the cable 13, lies within the recess 33 which is filled with a semi-rigid resin 38. A resilient sleeve 39 is also placed over the cable 13 to contact the resin 38 and is held in position by means of a sealing ring 40 screwed into the plug 31a. An internal annular groove 41 is cut in the plug 31a at the part of the recess 33 which lies adjacent the sealing ring 40, to ensure retention of the filling or lining of resin 38.

The electrical lead-in connector thus obtained is robust and gives a hermetic seal even under very high pressures. This is promoted by the part played by the resin in the internal screwthreads cut within the holes 34a and 34b and in the screw-threads formed on the rods 35a and 35b.

In one specific construction, the casing 1 is of approximately 200 mm in external diameter, having a bore of approximately 160 mm and having a height of the order of 140 mm. A frustoconical cover provided with four rapid-clamping locking screws may be installed on the enclosure with the interposition of a toroidal sealing joint. The whole is produced in aluminium alloy protected by deep anodic oxidisation.

On the other side from the cover, as shown in FIG. 1a the window 2, which is frustoconical and produced from a methyl polymethacrylate such as PERSPEX, is fitted on complementary seats with the interposition of toroidal sealing joints. Window 3 is constructed in a manner similar to Window 2.

This construction of casing may house photographic apparatus which will produce pictures measuring 6 × 6 cm.

The electric shutter release circuit will not be described in detail as it is not significant to the present invention and is within the competence of those versed in the art. However, apart from the elements hereinbefore described, this circuit comprises an electronic array mounted on a printed circuit for calibrating the triggering pulse and for the purpose of running a check in a single operation on the coupling connections, the reed switch 4, the flash generator, and the priming of the photographic apparatus. This check occurs by the action of a push-button, and an indicator bulb lights if all the elements are in satisfactory operating condition.

The presence of a single flash generator has been mentioned. However, in order to increase the illuminating capacity, several flash generators, possibly three in number, may be arranged in the sealed casing; these generators may be situated behind a shared window or behind several individual windows.

What we claim is:

1. An apparatus for taking underwater pictures on making contact with the sea-bed, the apparatus comprising a sealed casing provided with at least one window; camera means and a flash generator housed within the casing; a framework on which the casing is adjustably mounted; means for connecting the framework to a float and means for detachably connecting the framework to ballast; electromagnetic triggering means arranged between the float and the ballast to close an electric circuit when contact is made with the sea-bed; an electromagnetic control device arranged within the sealed casing to actuate the camera means and the flash generator on closing of said electrical circuit; and an electric cable which provides a sealed connection between the electromagnetic triggering means and the electromagnetic control device; wherein said framework is provided with two parallel upright members which are formed with series of aligned holes, and said casing is clamped in a collar secured on the framework by transverse screws which extend through two aligned holes of said series; wherein said framework includes a tubular member through which a cable extends to connect the framework to the float; wherein said sealed casing comprises two windows, one facing the object lens of the camera means and the other facing the flash generator; and wherein each of the said windows has a frustoconical part in mating engagement with a corresponding frustoconical part of said casing, and a toroidal sealing joint is interposed between the two frustoconical parts.

2. An apparatus for taking underwater pictures on making contact with the sea-bed, the apparatus comprising a sealed casing provided with at least one window; camera means and a flash generator housed within the casing; a framework on which the casing is adjustably mounted; means for connecting the framework to a float and means for detachably connecting the framework to ballast; electromagnetic triggering means arranged between the float and the ballast to close an electric circuit when contact is made with the sea-bed; an electromagnetic control device arranged within the sealed casing to actuate the camera means and the flash generator on closing of said electrical circuit; and an electric cable which provides a sealed connection between the electromagnetic triggering means and the electromagnetic control device; wherein said casing is removably mounted on said framework and said electric cable provides a removable connection between said electromagnetic triggering means and said electromagnetic control device; wherein said electromagnetic triggering means comprise a cylindrical member formed with a blind axial bore; a plunger which is axially movable in said bore; a permanent magnet mounted on the head of the plunger which faces the normally upper end of said bore; means for holding the plunger with the magnet within the bore; means for urging the plunger and the magnet towards the upper end of the bore; a reed switch which is arranged in a recess in said cylindrical member adjacent the closed upper end of said bore and which is connected in series in said electrical circuit; wherein said plunger extends out of said bore as a rod of smaller diameter and an apertured plug is screwed into the bore to hold the plunger and said permanent magnet within the bore; wherein said means for urging said plunger and said permanent magnet upwardly comprise first connecting means on said plunger, second connecting means on said cylindrical member, and at least one elastic member stretched between the first and second connecting means; and wherein said first connecting means comprises a small plate which is formed with lugs and is arranged at right angles to the axis of said plunger and remote from the said permanent magnet, and which is clamped in position between a nut and a check nut, said second connecting means comprises recesses in said cylindrical member, and a pair of elastic members in the form of loops are anchored in said recesses and stretched round the lugs of said small plate.

3. An apparatus for taking underwater pictures on making contact with the sea-bed, the apparatus comprising a sealed casing provided with at least one window; camera means and a flash generator housed within the casing; a framework on which the casing is adjustably mounted; means for connecting the framework to a float and means for detachably connecting the framework to ballast; electromagnetic triggering means arranged between the float and the ballast to close an electric circuit when contact is made with the sea-bed; an electromagnetic control device arranged within the sealed casing to actuate the camera means and the flash generator on closing of said electrical circuit; and an electric cable which provides a sealed connection between the electromagnetic triggering means and the electromagnetic control device; wherein said small plate has two symmetrical lugs corresponding to two anchoring recesses formed symmetrically in said cylindrical member, and two elastic loops are anchored symmetrically in the recesses and stretched symmetrically around said lugs; wherein said cylindrical member of the electromagnetic triggering means is connected by a fitting member to said framework and said plunger of the triggering means is arranged to be connected to said ballast in a separable manner by means of a cable and an automatic releasing device; wherein said fitting member comprises a stirrup passing round part of said framework, the yoke of the stirrup being formed with an opening through which said cylindrical member extends, and a screw-threaded cap being screwed onto the cylindrical member to abut against said yoke; and wherein said framework includes a tubular member through which a cable extends to connect the framework to the float.

4. An apparatus for taking underwater pictures on making contact with the sea-bed, the apparatus comprising a sealed casing provided with at least one window; camera means and a flash generator housed within the casing; a framework on which the casing is adjustably mounted; means for connecting the framework to a float and means for detachably connecting the framework to ballast; electromagnetic triggering means arranged between the float and the ballast to close an electric circuit when contact is made with the sea-bed; an electromagnetic control device arranged within the sealed casing to actuate the camera means and the flash generator on closing of said electrical circuit; and an electric cable which provides a sealed connection between the electromagnetic triggering means and the electromagnetic control device; wherein said electric cable is connected to said electromagnetic triggering means and to said electromagnetic control device by means of terminals embedded in a semi-rigid resin with the interpositioning of a toroidal sealing joint around said cable; and wherein said electric cable is connected to said electromagnetic control device by means of a sealed connector which comprises a plug formed with an axial recess and screwed into said casing with the interpositioning of a sealing joint, screw-threaded rods electrically connected to said cable and with an interposed lining of polymerisable resin passing through tapped holes in said plug between the plug recess and the inside of the casing, a second toroidal joint around said cable inside the plug recess, a lining or filling of semi-rigid resin in the plug recess, a resilient sleeve around said cable at the outside of the plug recess and substantially in contact with said filling, and a sealing ring screwed into said plug to hold said resilient sleeve in position.

* * * * *